United States Patent [19]

Stark

[11] Patent Number: 5,427,708
[45] Date of Patent: Jun. 27, 1995

[54] GLOW-IN-THE-DARK LIQUID CLEANSERS

[76] Inventor: Thomas O. Stark, 8 Summit Dr., Lebanon, N.J. 08833

[21] Appl. No.: 203,046

[22] Filed: Feb. 28, 1994

Related U.S. Application Data

[63] Continuation-in-part of Ser. No. 47,206, Apr. 16, 1993.

[51] Int. Cl.$^6$ .................. C11D 17/00; C09K 11/06
[52] U.S. Cl. .................. 252/108; 252/301.4 P; 252/DIG. 16; 252/700; 252/368; 252/174; 252/90; 252/92; 252/301.21
[58] Field of Search .................. 252/108, 135, 174.16, 252/368, 134, 174, 90, 92, DIG. 16, 700, 301.40, 301.21

[56] References Cited

U.S. PATENT DOCUMENTS

| | | | |
|---|---|---|---|
| 3,669,891 | 6/1972 | Greenwood et al. | 252/90 |
| 4,081,394 | 3/1978 | Bartley | 252/91 |
| 4,762,642 | 8/1988 | Joshi et al. | 252/368 |
| 4,999,138 | 3/1991 | Nebashi et al. | 252/543 |
| 5,047,167 | 9/1991 | Steyn et al. | 252/160 |
| 5,141,664 | 8/1992 | Corring et al. | 252/90 |
| 5,183,429 | 2/1993 | Bitton | 446/73 |
| 5,246,631 | 9/1993 | Halbritter | 252/700 |

FOREIGN PATENT DOCUMENTS

| | | | |
|---|---|---|---|
| 3022003 | 12/1981 | Germany | C11D 17/04 |
| 0602915 | 8/1978 | Switzerland | C11D 17/00 |
| 9329 | of 1905 | United Kingdom | 252/92 |
| 2235931A | 3/1991 | United Kingdom | C11D 17/04 |

*Primary Examiner*—Paul Lieberman
*Assistant Examiner*—Patricia Hailey
*Attorney, Agent, or Firm*—Kenneth P. Glynn; Diane L. Ferrone

[57] ABSTRACT

The present invention is directed to liquid soap which includes a glow-in-the-dark feature. The soap has a basic soap composition and includes an effective amount of active glow-in-the-dark material contained within the soap and is dispersed therethrough. The glow-in-the-dark material, dispersed directly into the soap, may be chemiluminescent, phosphorus or other known active glow-in-the-dark material. By "active" is meant that it glows in the dark before being dispensed and is not latent material which requires an initiator such as air, water, or other stimulant to be activated. In another embodiment, the liquid soap itself does not contain the glow-in-the-dark material, but contains a glow-in-the-dark object, such as a toy or ornament object.

9 Claims, 2 Drawing Sheets

GLOW-IN-THE-DARK LIQUID CLEANSERS

REFERENCE TO RELATED CASE

This application is a continuation-in-part of U.S. patent application Ser. No. 08/047,206, filed on Apr. 16, 1993 by the same inventor herein, and entitled "Glow-In-The-Dark Soap".

BACKGROUND OF THE INVENTION

1. Field of the Invention

The present invention relates to a liquid cleanser, e.g. liquid soap or shampoo, which has a novel feature contained therein. More specifically, the present invention is directed to a liquid cleanser having some active glow-in-the-dark feature. This may take a form of particular glow-in-the-dark elements, i.e. chemicals dissolved into the cleanser itself, or a nonhomogeneous additive to it which will actively glow in the dark.

Information Disclosure Statement

The present invention is directed to glow-in-the-dark type liquid cleansers such as liquid soaps and shampoos.

Novel aspects to bars or cakes of soaps are well known and improvements to soap to enhance their novelty have been developed for the past couple of decades. The following is a sampling of the prior art relating to enhanced soap bars:

U.S. Pat. No. 4,081,394, issued to Louise M. Bartley in 1978 described a bar of soap which has an outer shell of soft soap material, an intermediate shell of harder soap material and an inner core of still harder material. The inner core is inscribed with different words, some of which entitle the user to a free prize after the inner core has been reached by the user.

U.S. Pat. No. 5,141,664, issued to Robert Corring and Robert Gabriel and Assigned to Lever Brothers Company, a Division of Conopco, Inc., describes a "Clear Detergent Gel Composition With Opaque Particles Dispersed Therein". The opaque particles may have an active material uniformly dispersed and suspended throughout the clear gel.

U.S. Pat. No. 5,183,429, issued to Mary K. Bitton in 1993 describes a soap bar with a childrens' toy assembly. A small toy or figurine is located inside a transparent body of soap. The soap fully surrounds and encapsulates the small toy. The toy is completely visible within the body of soap and the body of soap is shaped like a figurine or is in another form which may complement or conform to the shape of the inner toy. A clear or colored plastic container whose shape matches the shape of the body of soap serves as a container for the soap and may also serve as a soap dish.

United Kingdom Patent No. GB 2,235,931A describes a cake of soap which has display means adhered to or embedded therein. The display means includes at least one deposit of temperature response of liquid crystal material which undergoes a reversible, visible color change when passing through a predetermined temperature of from 25° C. to 45° C. The display means is intended to change its display when moving between water at a temperature above, and ambient air at a temperature below, the predetermined aforesaid temperature.

Swiss Patent No. 602,915 describes a floating soap which has a plastic core which may have a configuration of an animal and which is coated with a soap layer sufficient for 5 or 10 washes.

German Patent DE 30 22 003 A1 describes a soap for children which contains a capsule and there is a concealed toy or other prize as an incentive for a child to use soap.

U.S. Pat. No. 3,669,891 to Greenwood et al., describes chemical compounds which have been adapted to emit visible light during use in response to stimuli such as oxidation, contact with water, or chemical compound initiators. However, this patent teaches chemical compounds which do not have activated glow-in-the-dark materials which will glow prior to actual dispensing and washing, as in the present invention.

Notwithstanding the cited prior art, there is no teaching or suggestion to render obvious the present invention wherein a liquid cleanser contains an active glow-in-the-dark feature.

SUMMARY OF THE INVENTION

The present invention is directed to liquid soap which includes a glow-in-the-dark feature. The soap has a basic soap composition and includes an effective amount of active glow-in-the-dark material contained within the soap and is dispensed therethrough. The glow-in-the-dark material, dispersed directly into the soap, may be chemiluminescent, phosphorus or other known active glow-in-the-dark material. By "active" is meant that it glows in the dark before being dispersed and is not latent material which requires an initiator such as air, water, or other stimulant to be activated.

DETAILED DESCRIPTION OF THE PRESENT INVENTION

Figure 1:
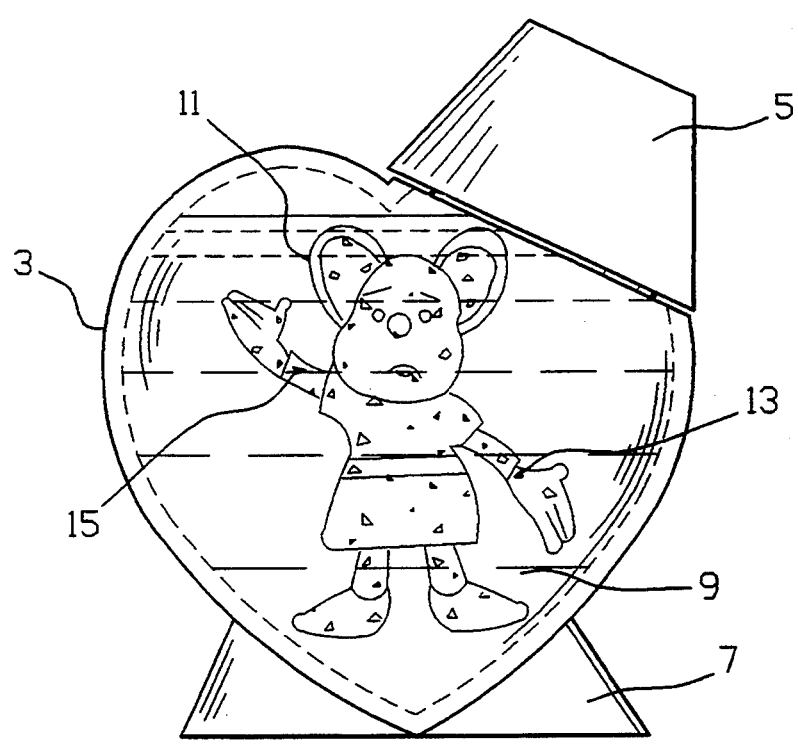
FIG. 1 shows a front view of a present invention liquid soap which includes a soap composition and a glow-in-the-dark object contained within the soap composition.

In the present invention, in one preferred embodiment, a liquid soap is formed with conventional opaque soap composition material, which is well known in the art to the artisan, and dispersed throughout the liquid soap is an effective amount of the glow-in-the-dark material. By "liquid" soap is meant any cleanser or detergent which is in a fluid state, i.e. the usual liquids, as well as creams, pastes, foams, gels, solutions and dispersions. It should be noted that by "effective amount" is meant sufficient glow-in-the-dark material to actually have the liquid soap to glow in the dark either during its exposure in its usage, i.e. when at the end user's sink or shower or the like. Thus, it is anticipated that the glow-in-the-dark liquid soap of the present invention will be preactivated before being sold to the user and/or activated by exposure to a light source, and does not require some affirmative initiation, e.g. air or water, for activation.

In another preferred embodiment of the present invention, the liquid soap is translucent or transparent, and includes the glow-in-the-dark material, and the soap may initially be made of transparent soap composition, but there may be a significant amount of glow-in-the-dark material so as to render the liquid soap translucent.

For example, there may be glow-in-the-dark coloration of a yellowish tinge to the composition after formation making it translucent.

In all embodiments of the present invention, the glow-in-the-dark aspect of the soap affords substantial advantages to the present invention. Not only does it enable a user to locate the soap in the dark, whether at a sink or elsewhere, but it is an attraction to children to encourage them to wash.

The glow-in-the-dark material which is incorporated within the construction of the soap may be mixed in at the time of formation of the soap, or may be included after it has been initially formed. In any case, the glow-in-the-dark material may be any of the varieties of glow-in-the-dark materials commercially available or which may become available. These would include any chemiluminescent material and would include fluorescent dyes, phosphorescent dyes, glow-in-the-dark particles, day-glow pigments and the like.

The Kirk-Othmer Encyclopedia of Chemical Technology (third addition, volume 6, page 612), indicates that fluorescent pigments or dyes depend upon their ability to absorb light at one wavelength and to remit it in a narrow intense band at a longer wavelength . . . the dyes used include the rhodamines which emit pink and the aminonaphthalimides which are bright greenish-yellow. To obtain the maximum effect, the dyes are dissolved in brittle resins at low concentrations. Color resins are then ground to powders and used as pigments. The brightness of such a combination far exceeds that of any pigment alone. It further indicates that fluorescent dyes do not have light fastness and their use is confined to the lower temperature processing. Further, at volume 14, pages 546 and 547, it is indicated that there are many types of luminescent materials, some of which require a special source of excitation such as an electric discharge or ultraviolet radiation. Daylight-fluorescent pigments, in contrast, require no artificially general energy. Daylight, or an equivalent white light can excite these unique materials not only to reflect colored lights selectively, but to give off an extra glow of fluorescent light, often with high efficiency and surprising brilliance . . . Daylight-fluorescent pigments which are particles of colorless resins with few exceptions, and contain dye stuffs that not only have color but are capable of intense fluorescence in solution. Typically, about one to two percent of the glow-in-the-dark material based on the total weight of the soap is added as a dry blended material or is first formulated into a concentration pellet which then is blended into the soap. Thus, a liquid soap of the present invention may be formed which is transparent and substantially clear but contains particles of active glow-in-the-dark materials. Alternatively, there may be a sufficient number of particles which contain the glow-in-the-dark material so as to render the liquid soap formed translucent rather than transparent or only partially transparent. Finally, the material formation of the present invention glow-in-the-dark soap may initially be translucent or opaque rather than transparent and additional glow-in-the-dark materials may be added thereto.

The liquid soap of the present invention may be used in an opaque, translucent or transparent container and work effectively. In the case of an opaque container, only soap on the outside of the container will show as glowing in the dark after first use. In other preferred cases of transparent or translucent containers, both the liquid soap on the inside and outside may glow in the dark. When the liquid soap itself is opaque, only its surface aspects will glow in the dark. When the container and the liquid soap are both transparent, a three-dimensional, suspended, or floating glow-in-the-dark feature will result.

In another preferred embodiment of the present invention, the liquid soap does not contain dispersed glow-in-the-dark material but, instead contains a toy or ornamental object therein. This object is included in a transparent or opaque liquid soap and will, itself, contain the glow-in-the-dark material. Thus, liquid soap may be included in a translucent, clear or nearly clear container with the glow-in-the-dark object contained within the soap in the container.

In the case of objects inserted in the soap, resins of construction may be solvents for the dyes. For example, a thermoplastic molten resin may be formed containing the dye and, upon cooling to room temperature, the resin mass becomes very brittle. It may be pulverized to the proper fineness and added to other materials.

Manufacturers of fluorescent pigments, phosphorescent materials and other chemiluminescent materials offer varieties of products which may be used with most plastics used today for childrens' toys, containers and other consumer items and these could readily be miniaturized objects inserted into the soap during packaging of the soap.

FIG. 1 shows a front view of a present invention liquid soap with soap container 3 having a cap 5 and a base 7; soap composition 9 contained within the transparent container 3 and ornamental object 11 which includes glow-in-the-dark material represented by particles 13 and 15. The soap composition 9 may be translucent or transparent as may be container 3. Ornamental object 11 may be transparent, translucent or opaque. If it is opaque, than the glow-in-the-dark material may be a coating.

Figure 2:
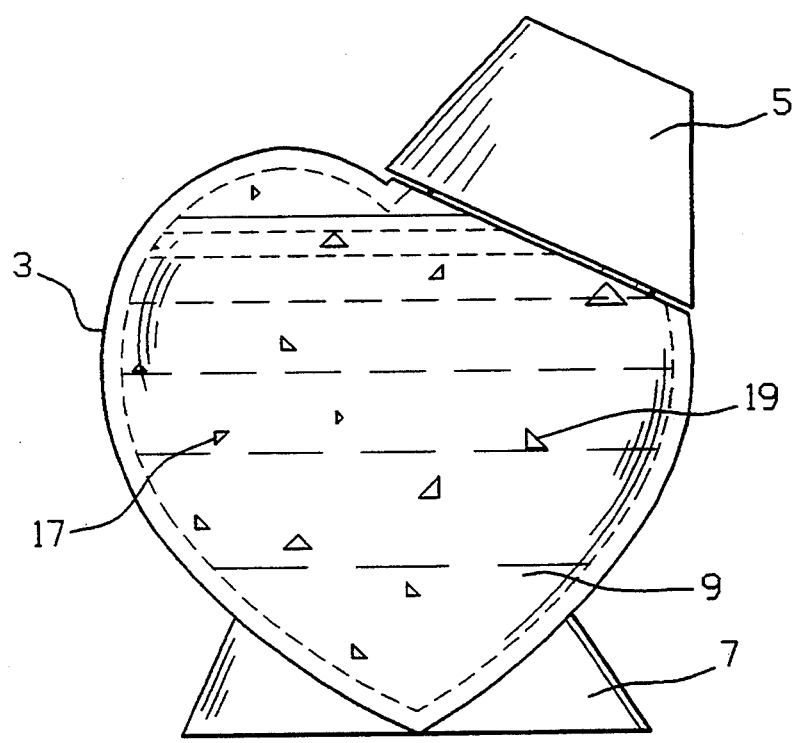
FIG. 2 shows a front view of a preferred embodiment of a present invention liquid soap which includes a soap composition with glow-in-the-dark particles dispersed throughout.

FIG. 2 shows another preferred embodiment of the present invention wherein like parts are like numbered to those of FIG. 1. However, in the embodiment of FIG. 2, the glow-in-the-dark material, represented by particles 17 and 19 is dispersed throughout the soap composition 9.

Obviously numerous modifications and variations of the present invention are possible in light of the above teachings. It is therefore understood that within the scope of the appended claims, the invention may be practiced otherwise than as specifically described herein.

What is claimed is:

1. A liquid soap, which comprises:
   (a) a liquid soap composition; and,
   (b) an effective amount of an active glow-in-the-dark material contained within said liquid soap and dispersed therethrough, said effective amount being sufficient to enable a user to locate the liquid soap in the dark, said glow-in-the-dark material being phosphorescent.

2. The liquid soap of claim 1 wherein said soap composition is transparent.

3. The liquid soap of claim 1 wherein said soap composition is translucent.

4. The liquid soap of claim 1 wherein said soap composition is opaque.

5. The liquid soap of claim 1 which further comprises a container with said soap contained therein, said container having a predetermined capacity.

6. The liquid soap of claim 5 wherein said soap composition is transparent.

7. The liquid soap of claim 5 wherein said soap composition is translucent.

8. The liquid soap of claim 5 wherein said container is translucent.

9. The liquid soap of claim 5 wherein said container is transparent.

* * * * *